US012323939B2

(12) United States Patent
Hans

(10) Patent No.: US 12,323,939 B2
(45) Date of Patent: Jun. 3, 2025

(54) INTERWORKING FUNCTION USING UNTRUSTED NETWORK

(71) Applicant: Wollochet Solutions LLC, Wilmington, DE (US)

(72) Inventor: Martin Hans, Bad Salzdetfurth (DE)

(73) Assignee: Wollochet Solutions LLC, Wilmington, DE (US)

(*) Notice: Subject to any disclaimer, the term of this patent is extended or adjusted under 35 U.S.C. 154(b) by 394 days.

(21) Appl. No.: 17/710,278

(22) Filed: Mar. 31, 2022

(65) Prior Publication Data
US 2022/0225263 A1 Jul. 14, 2022

Related U.S. Application Data

(63) Continuation of application No. 16/482,895, filed as application No. PCT/EP2018/052890 on Feb. 6, 2018, now abandoned.

(30) Foreign Application Priority Data

Feb. 7, 2017 (EP) .................................. 17155017

(51) Int. Cl.
H04W 60/00 (2009.01)
H04L 12/28 (2006.01)
(Continued)

(52) U.S. Cl.
CPC ....... H04W 60/005 (2013.01); H04L 12/2818 (2013.01); H04L 12/2834 (2013.01);
(Continued)

(58) Field of Classification Search
CPC ... H04W 60/005; H04W 12/06; H04W 12/50; H04W 8/08; H04W 8/12;
(Continued)

(56) References Cited

U.S. PATENT DOCUMENTS 6,445,922 B1   9/2002 Hiller et al.
6,978,317 B2  12/2005 Anantha et al.
(Continued)

FOREIGN PATENT DOCUMENTS

JP   2012050130   3/2012
RU   2488978      7/2013
(Continued)

OTHER PUBLICATIONS

[No Author Listed], "3rd Generation Partnership Project; Technical Specification Group Services and System Aspects; 3GPP system to Wireless Local Area Network (WLAN) interworking; System description (Release 13)," 3GPP TS 23.234, V13.0.0, Sep. 2016, 16 pages.

(Continued)

Primary Examiner — Jenee Holland
(74) Attorney, Agent, or Firm — Fish & Richardson P.C.

(57) ABSTRACT

The invention provides a method of registering an access in a network, the method comprising receiving in a second network a request to register a user equipment, UE, device over a second access network, the request including first information that the UE device is registered in a first network over a first access network; receiving in the second network second information regarding the UE device from the first network; establishing in the second network a security association with the UE device over the second access network; forwarding third information regarding the UE device to the first network by the second network; and registering in the first network the UE over the second access network while maintaining the registration of the UE in the first network over the first access network.

20 Claims, 8 Drawing Sheets

(51) Int. Cl.
*H04W 8/12* (2009.01)
*H04W 12/06* (2021.01)
*H04W 12/50* (2021.01)

(52) U.S. Cl.
CPC ............. *H04W 8/12* (2013.01); *H04W 12/06* (2013.01); *H04W 12/50* (2021.01); *H04L 2012/2841* (2013.01)

(58) Field of Classification Search
CPC ......... H04L 2012/2841; H04L 12/2818; H04L 12/283; H04L 12/2834
See application file for complete search history.

(56) References Cited

U.S. PATENT DOCUMENTS

| | | | |
|---|---|---|---|
| 7,512,687 | B2 | 3/2009 | Jung |
| 7,840,217 | B2 | 11/2010 | Patel et al. |
| 7,933,595 | B2 | 4/2011 | Pippert et al. |
| 8,249,037 | B2* | 8/2012 | Bachmann .......... H04W 36/322 370/332 |
| 8,392,584 | B2 | 3/2013 | Jean |
| 8,566,455 | B1 | 10/2013 | Zhao et al. |
| 8,780,922 | B2 | 7/2014 | Premec et al. |
| 9,137,231 | B2 | 9/2015 | Näslund et al. |
| 9,288,780 | B2 | 3/2016 | Walker et al. |
| 9,451,421 | B1 | 9/2016 | Allen et al. |
| 9,883,356 | B2 | 1/2018 | Lagerman |
| 10,182,053 | B2 | 1/2019 | Chen et al. |
| 2006/0126582 | A1 | 6/2006 | Saifullah et al. |
| 2006/0140196 | A1 | 6/2006 | Tanaka et al. |
| 2007/0006295 | A1* | 1/2007 | Haverinen .......... H04L 63/0272 726/14 |
| 2008/0026724 | A1 | 1/2008 | Zhang |
| 2008/0089290 | A1 | 4/2008 | Coulas et al. |
| 2008/0160959 | A1 | 7/2008 | Huang et al. |
| 2009/0059829 | A1* | 3/2009 | Bachmann ............ H04W 76/27 370/311 |
| 2009/0092045 | A1* | 4/2009 | Wu ........................ H04W 60/06 455/458 |
| 2009/0141683 | A1 | 6/2009 | Grinshpun et al. |
| 2009/0264131 | A1* | 10/2009 | Wu .................... H04W 36/0005 370/254 |
| 2010/0035578 | A1 | 2/2010 | Ahmed |
| 2010/0049843 | A1* | 2/2010 | Xiong ..................... H04W 8/26 709/245 |
| 2010/0189103 | A1* | 7/2010 | Bachmann .............. H04L 69/04 370/465 |
| 2011/0225632 | A1* | 9/2011 | Ropolyi .............. H04W 12/033 726/4 |
| 2012/0051321 | A1 | 3/2012 | De et al. |
| 2012/0269167 | A1* | 10/2012 | Velev ................ H04W 36/0011 370/331 |
| 2013/0308620 | A1 | 11/2013 | Bharadwaj |
| 2014/0245403 | A1* | 8/2014 | Li ........................... H04L 12/66 726/4 |
| 2015/0208292 | A1* | 7/2015 | Tang ....................... H04L 45/64 455/436 |
| 2015/0289224 | A1 | 10/2015 | Kabadi et al. |
| 2016/0150382 | A1 | 5/2016 | Lagerman |
| 2016/0198399 | A1 | 7/2016 | Kim et al. |
| 2017/0280496 | A1* | 9/2017 | Zetterlund ............ H04W 88/16 |
| 2017/0289883 | A1* | 10/2017 | Kiss ...................... H04W 76/12 |
| 2018/0167983 | A1* | 6/2018 | Salkintzis ............. H04W 76/15 |
| 2019/0037516 | A1* | 1/2019 | Kim .................... H04W 60/005 |
| 2020/0245284 | A1 | 7/2020 | Hans |

FOREIGN PATENT DOCUMENTS

| | | |
|---|---|---|
| WO | WO 2010/086029 | 8/2010 |
| WO | WO 2016/179800 | 11/2016 |
| WO | WO 2016/180865 | 11/2016 |

OTHER PUBLICATIONS

[No Author Listed], "3rd Generation Partnership Project; Technical Specification Group Services and System Aspects; Procedures for the 5G System; Stage 2; (Release 15)," 3GPP TS 23.502, V0.1.1, Jan. 26, 2017, 46 pages.

[No Author Listed], "3rd Generation Partnership Project; Technical Specification Group Services and System Aspects; System Architecture for the 5G System; Stage 2 (Release 15)," 3GPP TS 23.501 V0.2.0, Jan. 2017 (available on Feb. 6, 2017), 69 pages.

[No Author Listed], "3rd Generation Partnership Project; Technical Specification Group Services and System Aspects; System Architecture for the 5G System; Stage 2 (Release 15)," 3GPP, TS 23.501, V01.1, Jan. 2017, 74 pages.

ETRI, Nokia, et al., "23.501: Support of Non-3GPP access in 5G," SA WG2 Meeting #118bis, S2-170346, Spokane, WA, USA, Jan. 16-20, 2017, 5 pages.

International Preliminary Report on Patentability in International Appln. No. PCT/EP2018/052890, dated Aug. 22, 2019, 8 pages.

International Search Report and Written Opinion in International Appln. No. PCT/EP2018/052890, dated Apr. 6, 2018, 9 pages.

LG Electronics, "Clarification and evaluation about solution 4.20 (Session Management on the PDU session(s) via different accesses)," SA WG2 Meeting #118, S2-166549, Nov. 14-18, 2016, Reno, Nevada, USA, 5 pages.

LG Electronics, "Proposal on Interim agreement for multiple PDU sessions via different accesses," 3GPP SA WG 2 Meeting #118, S2-166548, Nov. 14-18, 2016, 8 pages.

LG Electronics, "Roaming UE connected over WLAN through N3IWF in HPLMN," SA WG2 Meeting #118-BIS, S2-170318, Jan. 16-20, 2017, Spokane, WA, USA, 2 pages.

LG Electronics, SA WG2 Meeting #118; S2-166549, Nov. 14-18, 2016, Reno, Nevada, USA. pp. 1-7.

Qualcomm Incorporated, "PCR to update solution #1.6 to include the untrusted non-3GPP access for the roaming scenario," 3GPP TSG SA WG3 (Security) Meeting #86, S3-170297, Feb. 6-10, 2017, 5 pages.

SA WG2, "[Draft] LS to GSMA on Roaming UE connected over WLAN through N3IWF in Hplmn," SA WG2 Meeting #S2-118BIS, S2-170321, Jan. 16-20, 2017, Spokane, Washington, USA, 2 pages.

Samsung, "AMF selection for untrusted non-3GPP access," SA WG2 Meeting #118bis, S2-170260, Jan. 16-20, 2017, Spokane, USA, 2 pages.

* cited by examiner

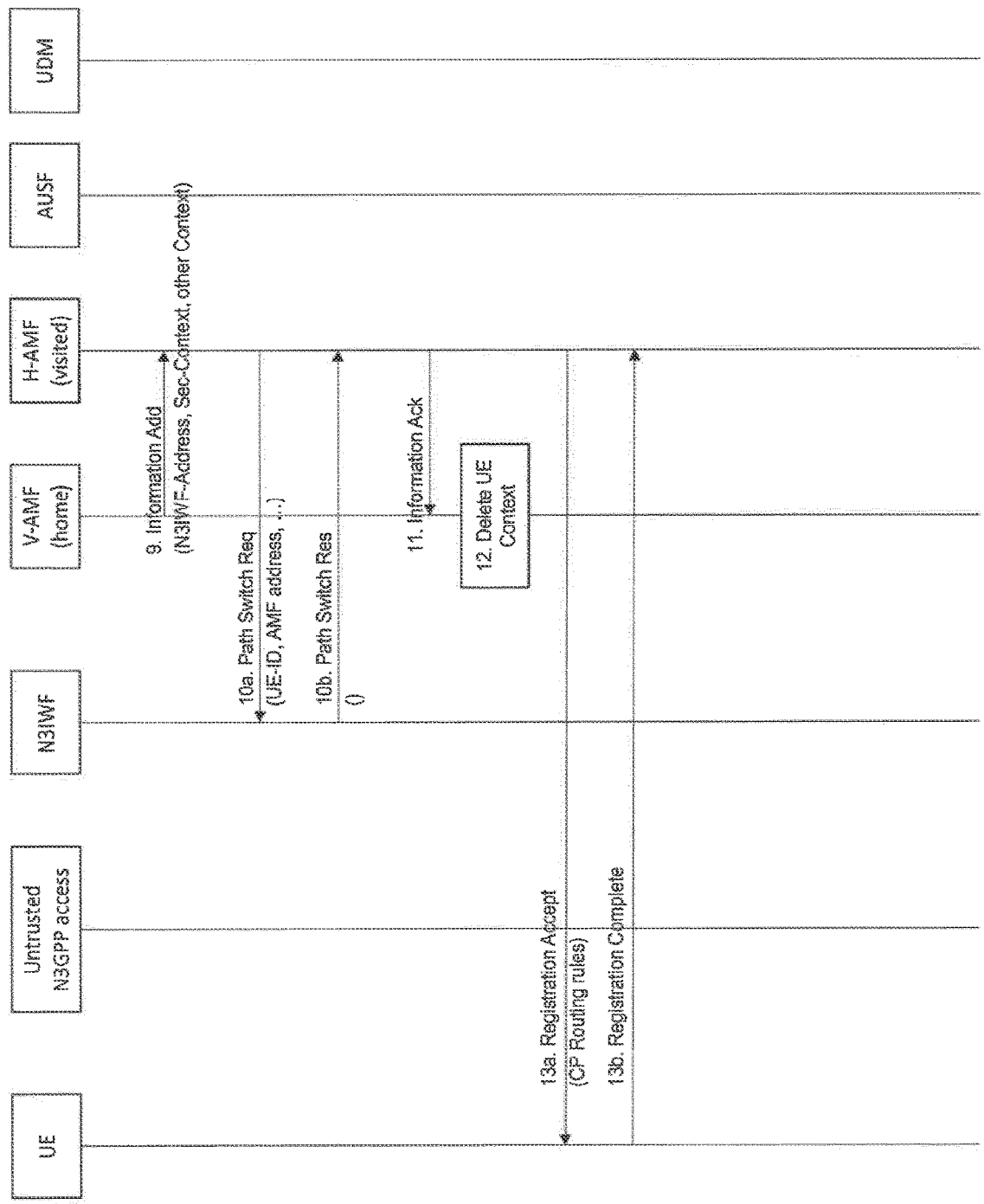

INTERWORKING FUNCTION USING UNTRUSTED NETWORK

CROSS-REFERENCE TO RELATED APPLICATION

This application is a continuation application of U.S. application Ser. No. 16/482,895, filed on Aug. 1, 2019, which is the United States national phase of International Patent Application No. PCT/EP2018/052890, filed Feb. 6, 2018, which claims priority to EP 17155017.1, filed Feb. 7, 2017, the entire contents of all which are hereby incorporated by reference.

The present invention relates to a technique for providing access to an access and mobility function (AMF) entity for a user equipment (UE) when accessing an untrusted network.

Background mobile network/WLAN interworking solutions are described, for example, in 3GPP standard TS 23.234.

When a UE finds itself in a roaming situation, attached to a visited network away from a home network, control of the UE resides in the visited network while authentication is done in the home network (between UICC/USIM and home subscriber data base). Services provided by the home network (so called home routing) are established by session management entities in the visited and home network and the service involves user plane functions (routers/gateways) also in both networks.

When the UE registers at a core network via an access network it provides a temporary identity, if it has one allocated, or its permanent identity. The nature of the temporary ID in 3GPP (e.g. Globally Unique Temporary Identity, GUTI) allows identification of an AMF that serves the UE (or MME in 4G systems) and allows a request context transfer between the old and a new AMF.

While the 5G core network (CN) architecture is not yet fixed, various functions and interconnections between functions can be expected to be present in the architecture. FIG. 1 shows a CN architecture for 5G as currently discussed in 3GPP. It is very similar to the core network architecture of the 4G system called Enhanced Packet System (EPS) or Enhanced Packet Core (EPC).

Cellular mobile networks in general consist of access networks and a core network as shown in FIG. 1. The access networks ((R)AN) provide mainly cellular radio access to mobile device, e.g. via GSM, UMTS or LTE. Additional access networks may provide access via short range radio access, e.g. WLAN, or fixed or satellite access to mobile or fixed devices (not present in FIG. 1). The access networks usually provide the complete functionality to setup, control and maintain radio connections to devices.

The core network provides mechanisms that are not access specific, e.g. authentication, authorization and accounting (AAA) of devices and/or subscribers, mobility between access networks and routing between the access networks and external data networks.

A UE in general accesses the 3GPP CN through an access network that may be a radio access network (RAN). If the radio access network is defined by 3GPP, e.g. the newly defined 5G radio access network, the access network provides a connection to an access and mobility function (AMF). The connection is named NG2. The AMF may, as all elements depicted in FIG. 1, be present multiple times in a single CN. An AMF is usually selected for a UE at registration of a UE in the network and only one AMF is responsible for a single UE at a time. The AMF, as all elements of the CN, can communicate to other CN elements through respective interfaces. The AMF for example connects to a unified data management (UDM) entity to receive information about the subscriber and subscribed services and to the authentication server function (AUSF) to authenticate a UE at registration and to get security credentials used for communication with the UE.

FIG. 2 depicts a registration procedure as currently defined by 3GPP. We describe the registration procedure with focus on the use case that the UE is already registered in the network and it uses the registration procedure to e.g. periodically renew its registration or inform about a change of the tracking area the UE is in.

A UE, when entering a cellular mobile network, transmits a registration request message to the (R)AN (step 1), e.g. a base station of the 5G RAN. The (R)AN selects in step 2, based on information provided by the UE in the message, an AMF. If the UE provided a temporary ID, this ID will indicate an AMF that already has a context of the UE stored (old AMF), otherwise the (R)AN may select any AMF. The (R)AN forwards the request to the selected AMF in step 3 to request registration at the CN.

Assuming that the UE is already registered and provided a GUTI or similar temporary ID, the selected AMF will request information about the UE from the old AMF in step 4. The old AMF provides the UE permanent ID and the complete UE context in step 5 which enables the newly selected AMF to take over the control of the UE. (Steps 6 to 9 are not of relevance to the present invention).

Assuming that messages from the UE were integrity protected and the integrity check using the received UE context succeeded in the new AMF, the new AMF accepts the control of the UE and the old AMF is informed in step 10 so it can delete the UE context.

The AMF may then select an appropriate subscriber data base (UDM) in step 13 where the new location of the UE, i.e. the fact that the UE is now reachable via the selected AMF, is stored in step 14. Now, a policy control function (PCF) may be selected based on the UE ID. (Steps 18 to 21 omitted).

The UE is now registered in the new AMF and it can request services, e.g. for data delivery. The logical communication interface between the UE and its selected AMF is named NG1 as shown in FIG. 1, it comprises the interface to the access network and the NG2 to the AMF.

If data delivery to a data network (DN) should take place, e.g. to the internet, the UE requests setup of an appropriate connection, a so-called PDU session, from the (R)AN through an NG3 interface to one or more user plane functions (UPF) and from there via N6 to the data network. The appropriate context activation in the UPFs as well as the allocation of network resources is done by a session management function (SMF) over NG4 interfaces. The SMF is selected by the AMF according to the service requested, subscriber data, the data network DN to be contacted and current network load. An application function (AF) may provide policies of the DN and it may communicate with application servers in the DN to adapt the quality of service provided to the UE.

A policy control function (PCF) may provide policies for service setup and quality. These policies can be understood to be rules that define service parameters based on subscriber, service and network status. In FIG. 1 only the interfaces that are most relevant for this invention are named, the other interfaces between entities are shown as straight lines without name; some interface are not shown.

If the UE needs to setup multiple connections to the same data network, e.g. for different quality of service or over different network addresses, the same or different UPFs may be involved and the same or different SMFs may be responsible. If the UE needs to setup multiple connections to different data networks similarly the same or different UPFs and SMFs may be involved. On the other hand, there is usually only one AMF responsible for the UE.

FIG. 3 shows a CN architecture in the roaming case, i.e. in the case where a subscriber accesses a CN that is not his home PLMN. The UE registers at the AMF in the visited network, but the AMF contacts the home network for authentication. The UDM and AUSF in the home network authenticate the UE and create a security context which is transferred to the AMF in the visited network.

For data transfer to a DN that is connected to the home PLMN, the so called home routing case, FIG. 3 shows that at least two UPFs are involved, one (H-UPF) in the home and one (V-UPF) in the visited network. Also, two SMFs are involved, an H-SMF and a V-SMF which configure the respective UPFs. Policies may be provided by the home and visited policy control function (PCF).

An alternative roaming use case is also shown in FIG. 3. The data network in this case is connected to the visited network. This so called "local breakout" scenario does not involve any UPFs or SMFs in the home network. This may be the typical use case for services that are not operator specific, e.g. connections to the internet, which can be served directly by the visited network saving the burden on the home network and the inter-network connections. More sophisticated or operator-specific services may be provided using home routing as explained above.

For registration in the core network over untrusted non-3GPP networks, a non-3GPP-interworking function (N3IWF) is used between the core network and the untrusted network. A secure connection IPsec is established between the UE and the N3IWF before registration completes. The N3IWF does not have a UE context before registration over non-3GPP access and it has to use the information provided by the UE to select an AMF.

3GPP defines various access networks to access the 3GPP core network, e.g. GSM, UMTS, HSPA, LTE, LTE-A and in near future a 5G access network. These networks are developed to work specifically under control of the 3GPP core network. The respective base stations support the security mechanisms of the core network and they are setup and maintained by the operator of the core network or a trusted third party. As a result, the 3GPP access network can be trusted by the core network.

In addition, the 3GPP core network is setup to support access networks that may not be setup and maintained by any trusted operator, they may also reside outside the operator's domain. These access technologies are collectively named non-3GPP access (N3GPP) and they may be so called untrusted N3GPP access if there is no trust relationship between the core network and the access network.

An example network architecture including (R)AN and N3GPP access technologies is depicted in FIG. 4. The figure shows the network elements of FIG. 1 that provide access to a CN via 3GPP access technologies ((R)AN) without roaming. In addition, FIG. 4 shows the UE of FIG. 1 connected to the CN via a non-3GPP access shown example wise as a wireless local area network WLAN (sometimes referred to as WiFi). The WLAN is an exemplary untrusted node providing access to the internet, therefore the WLAN itself provides to the UE a connection to a Non-3GPP interworking function (N3IWF). This new CN element is specified to allow access to the CN from untrusted N3GPP nodes. It may accumulate multiple untrusted Non-3GPP access networks (only one is shown in FIG. 4). The N3IWF is a device that may be maintained by the operator and may therefore be trusted.

The current state of the standardization of the non-3GPP access to a 5G core network describes the following functionality to be performed to access the core network from a UE via untrusted N3GPP access, e.g. WLAN, as depicted in FIG. 5.

The UE acquires IP-connectivity from the WLAN access point and performs a selection or detection of an N3IWF (steps 1a/b).

After that the UE starts to establish an initial security association (SA) with the selected N3IWF using the IKEv2 protocol defined by IETF in RFC4306 and its extensions. This initial SA makes encryption possible, but it does not mutually authenticate the UE and the NW. The UE then provides its identity to the N3IWF potentially together with other information (steps 2a-d).

The N3IWF selects an appropriate AMF, and transmits a registration request on behalf of the UE using the received UE ID (steps 3a/b). The request message contains also the access type, e.g. "untrusted non-3GPP access".

The AMF, not knowing the UE by its ID, selects an AUSF and requests user authentication (steps 4a/b).

Now, based on the UE ID provided, the AUSF can select or generate credentials and perform with the UE an EAP-based mutual authentication via AMF and N3IWF (steps 5a-f).

The AMF and N3IWF build security contexts and finally establish a master security association (SA) with the UE (steps 6a-d). This master SA constitutes an IPSec connection between UE and N3IWF that is used for exchange of core network control messages between UE and AMF. The master SA is also used to derive further child SAs that are used to secure user data transmission from or to the UE.

A security mode command (SMC) request message is sent to the UE and SMC complete is transmitted back to the AMF to finalize the security setup between UE and AMF (steps 7a-c). This constitutes an additional security layer on top (or within) the IKE SA established before. A Registration Accept message is transmitted to the UE, now securely encrypted and integrity protected by the AMF and N3IWF and the Registration Complete message from the UE to the AMF completes the registration.

The N3IWF communicates to the AMF over an NG2 interface. This interface is a general access independent interface between access networks and the AMF functions, i.e. it is basically identical to the NG2 interface that connects a 5G base station to the AMF function.

Once the IPsec tunnel between UE and N3IWF and the NG2 interface are securely setup, the UE has a route that constitutes its logical connection to the AMF, so called NG1. This route may be an alternative route to the NG1 interface established over the (R)AN.

The UE may now request to setup connections to a data network (DN) via UP functions over the untrusted WLAN.

A possible connection of a roaming UE over a WLAN through an N3IWF is described in 3GPP document S2-170318 (SA WG2 Meeting #118-BIS) in which two AMFs serve the UE, one located in the VPLMN and the other in the HPLMN. Further documents S2-170321 and S2-170260 from the same meeting indicates that the UE should be served by a single, or common, AMF since having two AMFs would lead to complicated issues.

WO 2016/180865 A1 describes handling a UE requesting access to a service via an untrusted non-3GPP network, especially detecting whether the UE is in a roaming scenario or not. The information is used by the network to restrict or allow services via the untrusted N3GPP access. It does not provide a solution for authenticating a UE in a home network while roaming to a visited network. Access via a non-3GPP network is also described in WO 2016/179800 A1 and U.S. Pat. No. 9,137,231 B2. Access using a non-3GPP unrecognized but trusted network connection is described in WO 2010/086029 A1.

US 2008/0160959 A1 describes a method for a roaming user to establish a security association with a visited network. The visited network establishes the security association by making use of authentication results of a generic authentication architecture in the home network.

N3GPP access is a general option which a mobile network operator may offer to increase coverage of its network (particularly indoors), increase quality of service to its users and offload data from its (R)AN. In a roaming case, the visited network may offer N3GPP access in addition to its (R)AN as well. The N3GPP based roaming scenario will not differ much, i.e. AMF in visited network contacting AUSF and UDM in home network and involvement of both home and visited SMFs and UPFs.

The home operator may prefer to provide direct access to his core network as much as possible. In the roaming case this means that a UE connected to a visited network could use a N3GPP access, e.g. WLAN, to contact his home network directly. This is indeed possible if the WLAN access is for example a general access to the public broadband internet. This will offload the traffic transmitted over N3GPP access from the visited network and from the network-to-network interface, it may thus reduce roaming costs for the home operator as well as the subscriber.

For this purpose, the UE will contact the N3IWF of its home operator and request access, i.e. register at the home network. However, the UE in this scenario is already registered at the visited network and only one registration at a single AMF is allowed in the 3GPP architecture.

There is no solution which allows the N3GPP-access over a home PLMN while registered in a visited PLMN with the aim of keeping the sole registration in the visited PLMN.

Especially, setup of a security association that finally allows control message exchange to the AMF in the visited network needs to be defined.

In addition, mechanisms to coordinate N3GPP access usage between visited and home network regarding the UE are required, e.g. conditions for the UE to access a home N3IWF.

The present invention provides a method of registering an access in a network, the method comprising receiving in a second network a request to register a user equipment, UE, device over a second access network, the request including first information that the UE device is registered in a first network over a first access network; receiving in the second network second information regarding the UE device from the first network; establishing in the second network a security association with the UE device over the second access network; forwarding third information regarding the UE device to the first network by the second network; and registering in the first network the UE over the second access network while maintaining the registration of the UE in the first network over the first access network.

The invention further provides a user equipment, UE, device adapted to register with a first network to obtain a first access with a first security association and thereafter to request a second access to a second network, the second access including establishing a second security association over the second access while maintaining the first access, whereby the UE device is arranged to provide information about the first access during an establishment of the second access.

In a still further aspect, the invention provides a public land mobile network, PLMN, arranged to receive from a user equipment, UE, device a request for a first registration of a first access, the request comprising information about a second registration with a second network, wherein the PLMN is arranged to perform a mutual authentication between the UE device and the PLMN and establish a secure connection over the first access and forward information about the first access to the second network, the information being such as to enable the second network to register the first access and use the secure connection over the first access to exchange registration with the UE device.

Also provided is a public land mobile network, PLMN, arranged to register a first access of a user equipment, UE, device, the registering comprising requesting authentication of the UE device from a second network, wherein the PLMN is arranged to receive from the second network a request for registration of a second access of the UE device, the second access including an established security association between the UE device and an entity providing the second access, the request comprising information used by the PLMN to connect to the UE device over the second access.

In order to allow a UE that is registered in a visited network to additionally register over N3GPP access to the home network, a function of the home network performs the necessary steps for setup of a security association and IPsec connection between the UE and the N3IWF in the home network similar to the AMF for the usual registration over N3GPP access. This function is termed a virtual home AMF, H-AMF in the following to differentiate it from the AMF in the visited network, here called V-AMF.

The UE requests access to the core network from a N3IWF of the home network providing its temporary ID it received from the V-AMF. In addition the UE indicates the request being for an additional access while maintaining the already established access. The N3IWK has no connection to the visited network and will thus select an AMF in the home network (H-AMF) to proceed with the request.

According to this invention, the H-AMF will contact the V-AMF and request information based on the temporary ID. The information may comprise the UE's permanent ID, UE capabilities and permission to register a secondary, N3GPP access. With this information the H-AMF will proceed the registration of the N3GPP access for the UE up to the point where the mutual EAP based authentication is finalized and the IP security association is established between the UE and the N3IWF.

The H-AMF will then provide information about the N3GPP access and the established security association to the V-AMF and request the V-AMF to add the N3GPP access to the existing UE context and finalize the registration procedure with the UE.

The difference to known methods, like e.g. handover in a cellular mobile network, is that the newly contacted AMF (H-AMF) requests information from the AMF the UE is currently registered in (V-AMF) not to handover the control of the UE to the new AMF. Instead, the control is kept and an additional access is added to the context. It is the H-AMF which will later delete the UE context. In legacy procedures, the new AMF only deletes the context of a UE if the handover failed for some reason. Only then would the old AMF continue to control the UE, but with an unchanged context. The processing of a registration as described above and forwarding and addition to an existing context is not known.

A difference to the known request to register (attach request) is that the N3IWF may receive information that the UE is already attached in another PLMN and requests to add the N3GPP access. This information can be received in various forms, either a simple flag in the attach request message or a specific message, e.g. a secondary attach request message or a secondary registration message may also be used for that purpose.

The N3IWF forwards this information to the H-AMF, e.g. in the initial UE message or in an additional message to the H-AMF. The H-AMF performs the AUSF selection and mutual authentication on the base of the permanent UE ID received from the V-AMF and uses the additional information about another registration according to one aspect of the invention.

According to a further aspect of the invention, after the IP security association is established between UE and N3IWF, the H-AMF may perform steps to forward the new UE context to the V-AMF to hand over the control of the N3GPP connection of the UE to the visited network while keeping the established security association between UE and N3IWF alive and continue using the security keys and other context information in the V-AMF which were received from the H-AMF.

Once the UE context regarding N3GPP-access is received in the V-AMF, the V-AMF will establish a connection to the N3IWF in the home network and the V-AMF will finalize the registration with the UE.

The benefit of the invention is that the setup of a security association and IPsec connection between a UE and an N3IWF is performed efficiently in a home network while finally a single control function for controlling the UE in the visited core network is maintained. The home network is enabled to forward the N3GPP related registration information to the visited network efficiently which was not possible according to known arrangements.

Another advantage of the invention is that by performing the security setup with the UE within the home network, the home network has the choice to treat the registration procedure as a usual primary registration procedure via N3GPP access and release the registration in the visited network. The home network operator has thus gained a way to keep control of the UE. The decision can be done based on information received in the H-AMF.

To setup a PDU session over the newly established N3IWF, there are two options. The first option is based on the legacy roaming architecture with a V-UPF and a H-UPF involved. In this option, the N3IWF in the home network would connect to a V-UPF in the visited network. Looking at the resulting data path it is obvious that this option obsoletes much of the advantage expected from the N3GPP access to the home network. The second option is thus preferable, where only a H-UPF is involved and the N3IWF connects to that H-UPF. There is no necessity to route data to the visited network first. The setup of such a PDU session is similar to existing methods, i.e. a new PDU session over the established (registered) N3GPP access is requested and the V-SMF decides to not involve a V-UPF but request the H-SMF to directly connect the N3IWK to the selected H-UPF.

There may be the necessity to provide lawful interception (LI) regarding the subscriber and this requirement may demand the traffic to be capable of interception by the visited network. In that case this invention proposes to keep the architecture as above (N3IWF routing to the H-UPF) and to configure a function in the H-UPF to copy data to an appropriate node or function in the visited network just for LI purposes. This would be a network internal configuration from the V-AMF in the visited network.

Preferred embodiments of the invention will now be described, by way of example only, with reference to the accompanying drawings in which:

FIG. 8 is a continuation of the message flow chart of FIG. 7.

FIG. 6 shows an architecture of a cellular mobile network in roaming case, similar to FIG. 3. In addition to the 3GPP-based access to the visited network, FIG. 6 shows a N3GPP access, shown in an exemplary manner as a WLAN access, providing access to a N3IWF of the home network.

The WLAN access is just an example and other access types may provide access to the N3IWF in the home network, i.e. other wireless networks like Bluetooth or WiMax, or fixed networks like LAN, DSL etc. The example depicted in FIG. 6 shows a connection of the UE to the WLAN, maybe a wireless connection according to any of the IEEE 802.11 standards family, and a fixed connection to the N3IWF which may be an IP-based connection routed through the public internet or other networks.

Figure 6:
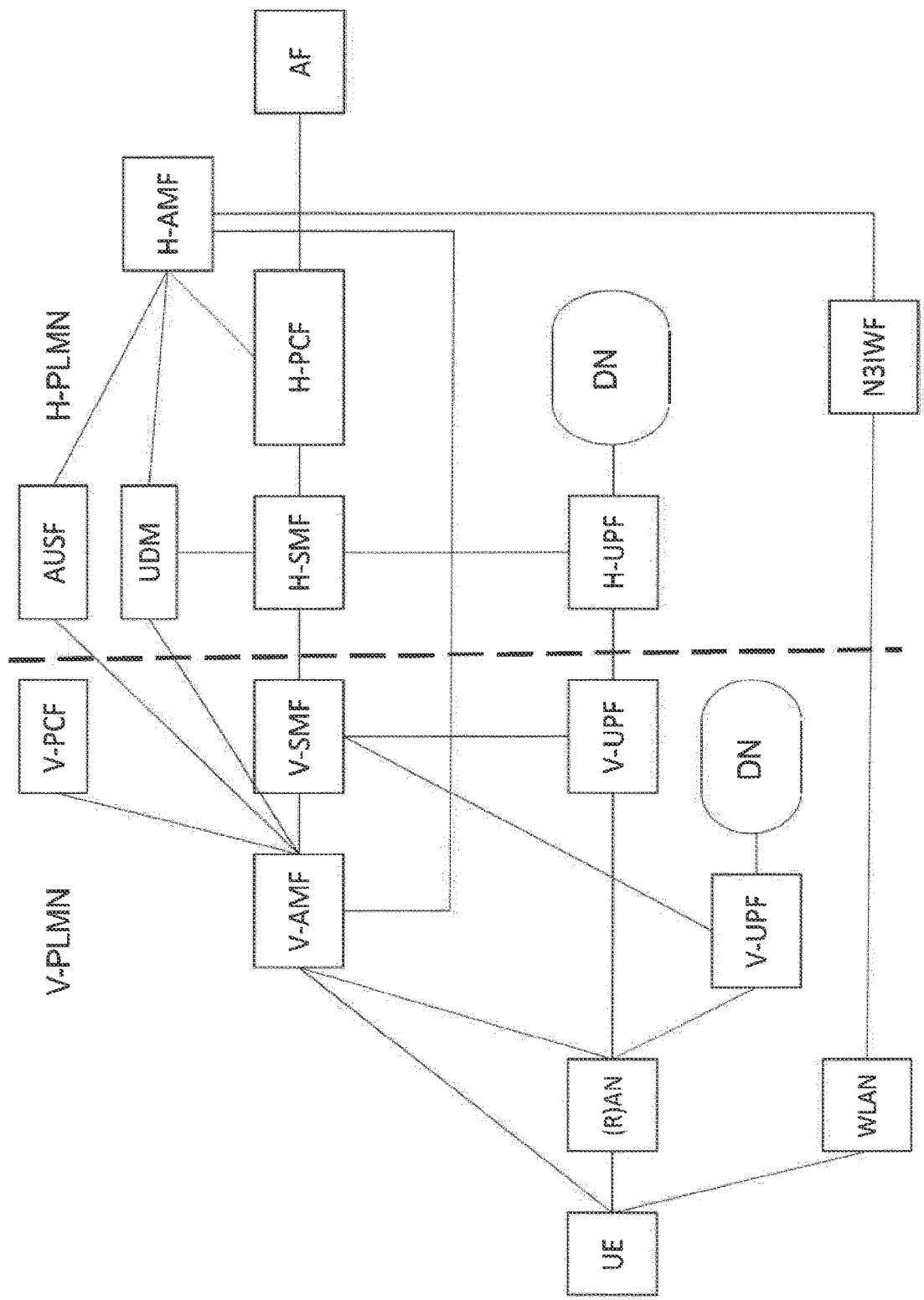
FIG. 6 is a schematic diagram of a network interworking arrangement incorporating the present invention

The N3IWF in FIG. 6 is shown to be connected to a virtual H-AMF (virtual in the sense that it is not actually responsible for the UE) which can communicate within the home network and with an identified AMF in other networks (V-AMF). The differentiation of H-AMF vs. V-AMF is only done to show the different functions within this invention. In fact, as there is always only one actual AMF responsible for the UE, the V-AMF, this distinction will not be made in the following describing the methods.

Figure 1:
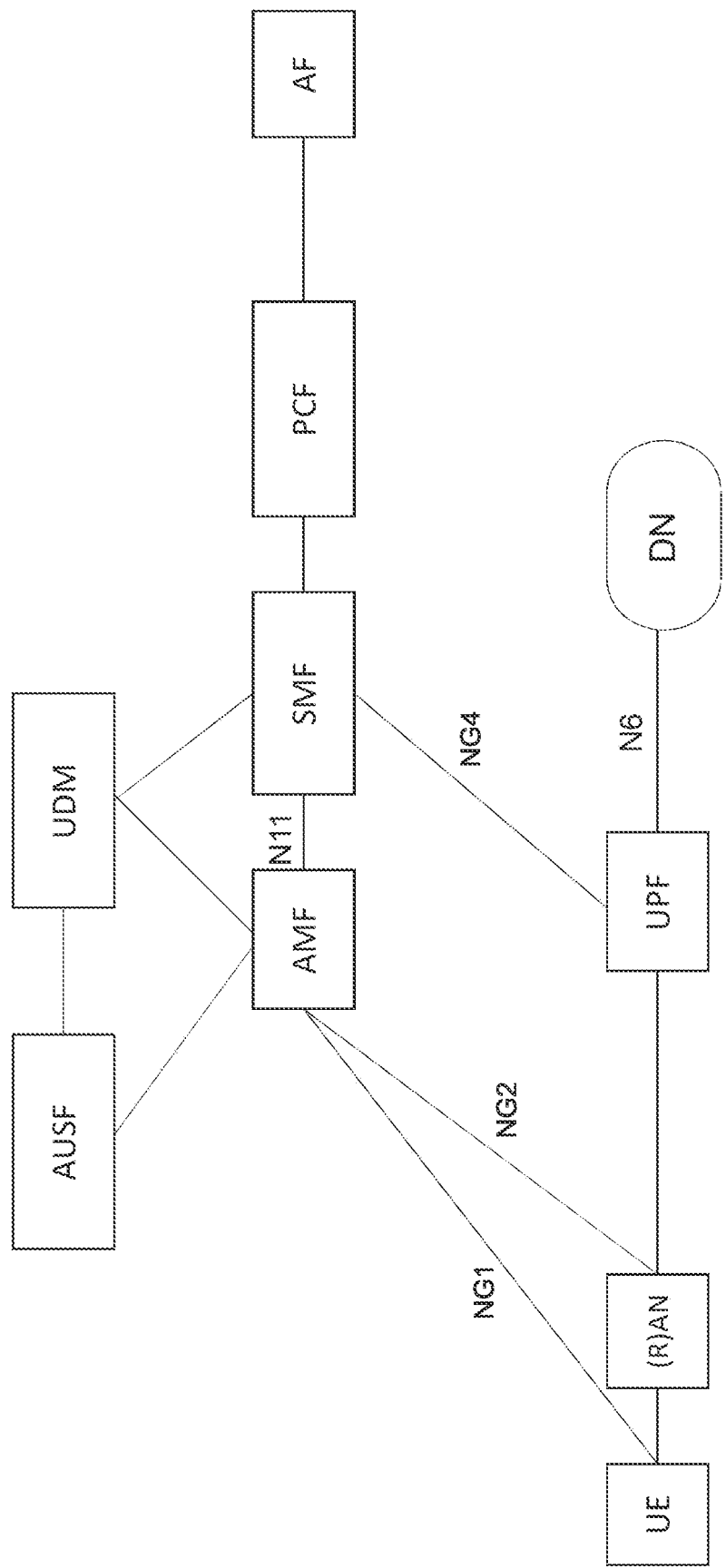
FIG. 1 is a schematic diagram showing a known network arrangement.
Figure 2:
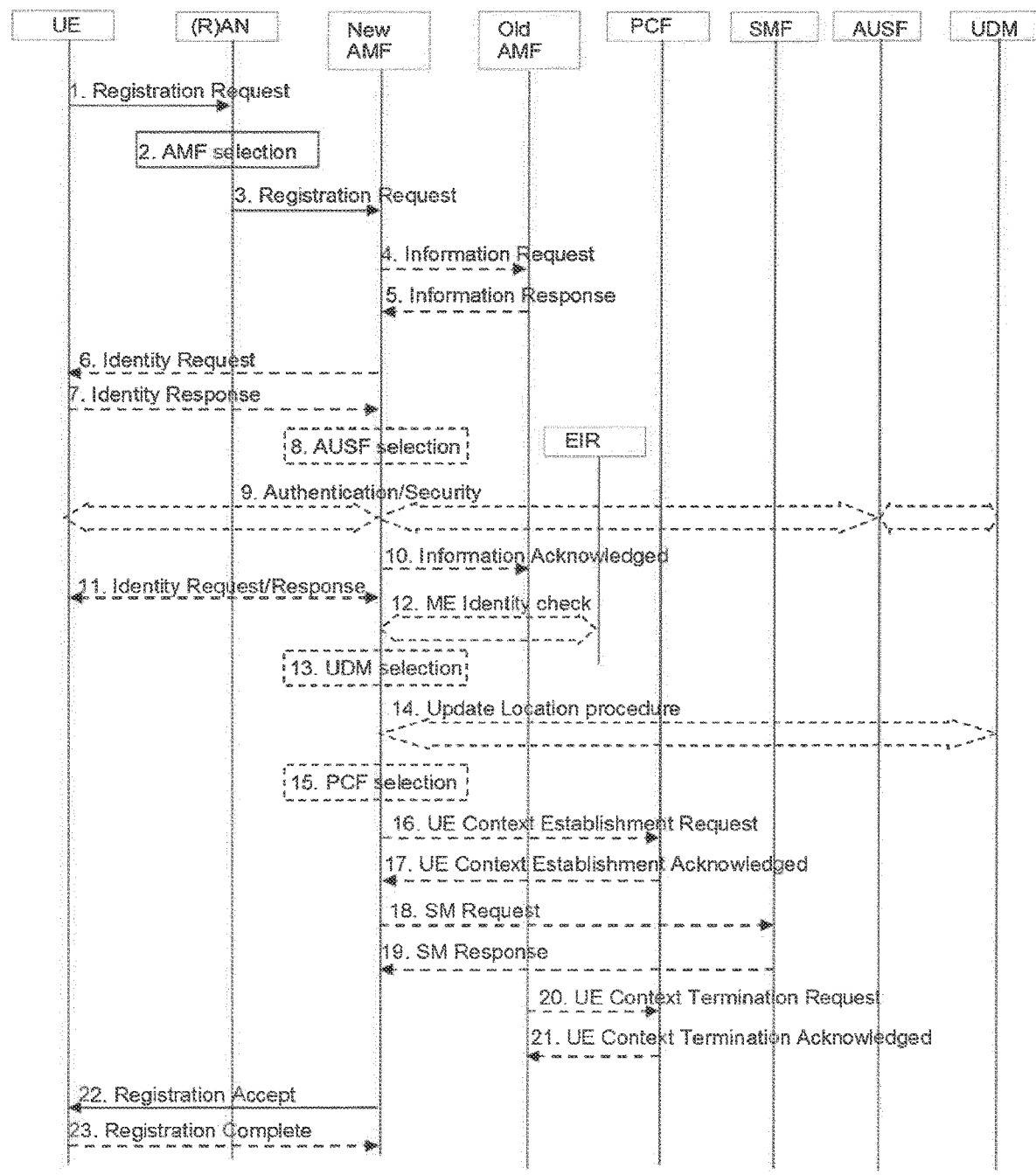
FIG. 2 shows a message flow chart of the known arrangement.
Figure 3:
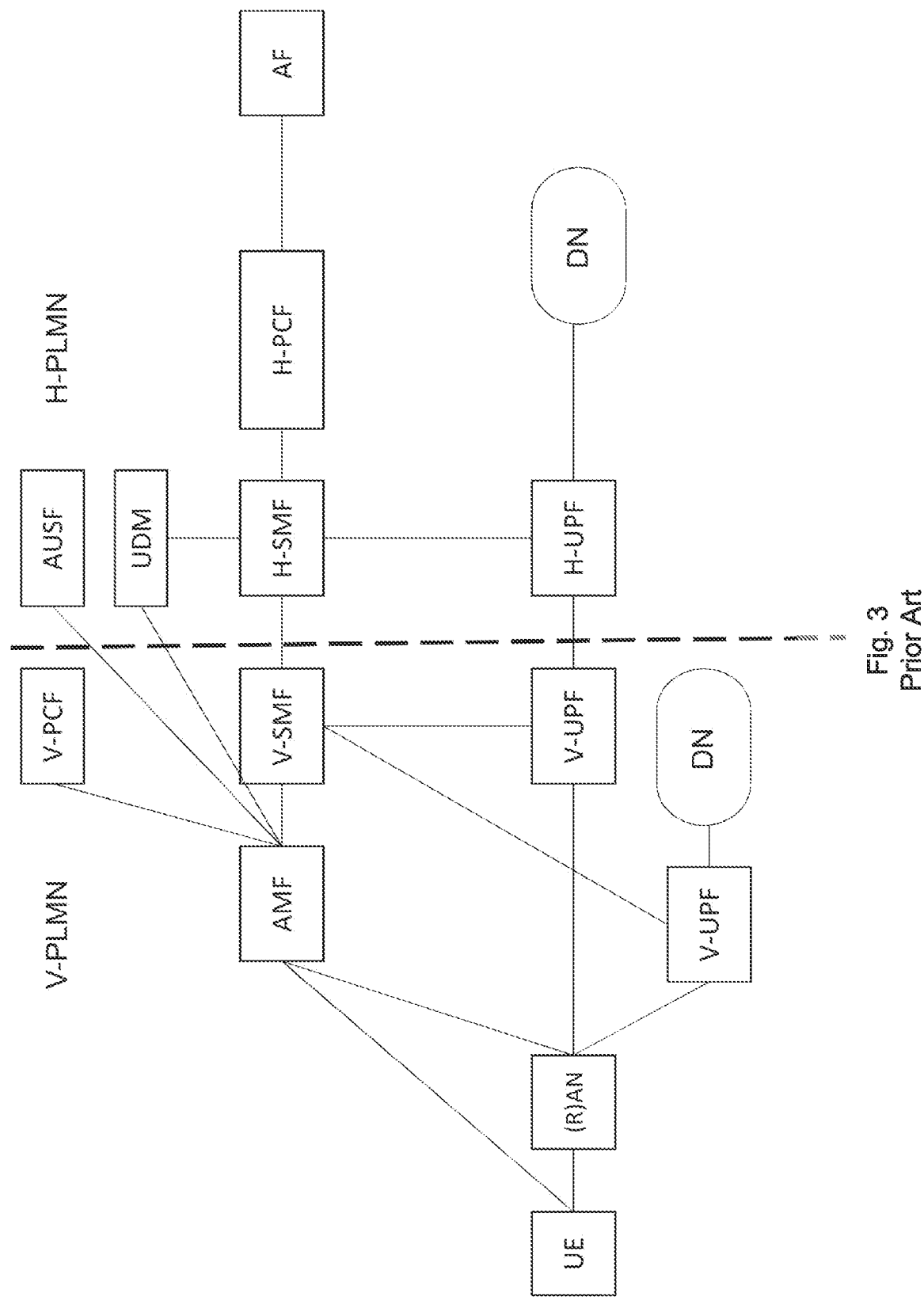
FIG. 3 shows a schematic diagram of a known arrangement of a visited network and a home network.
Figure 4:
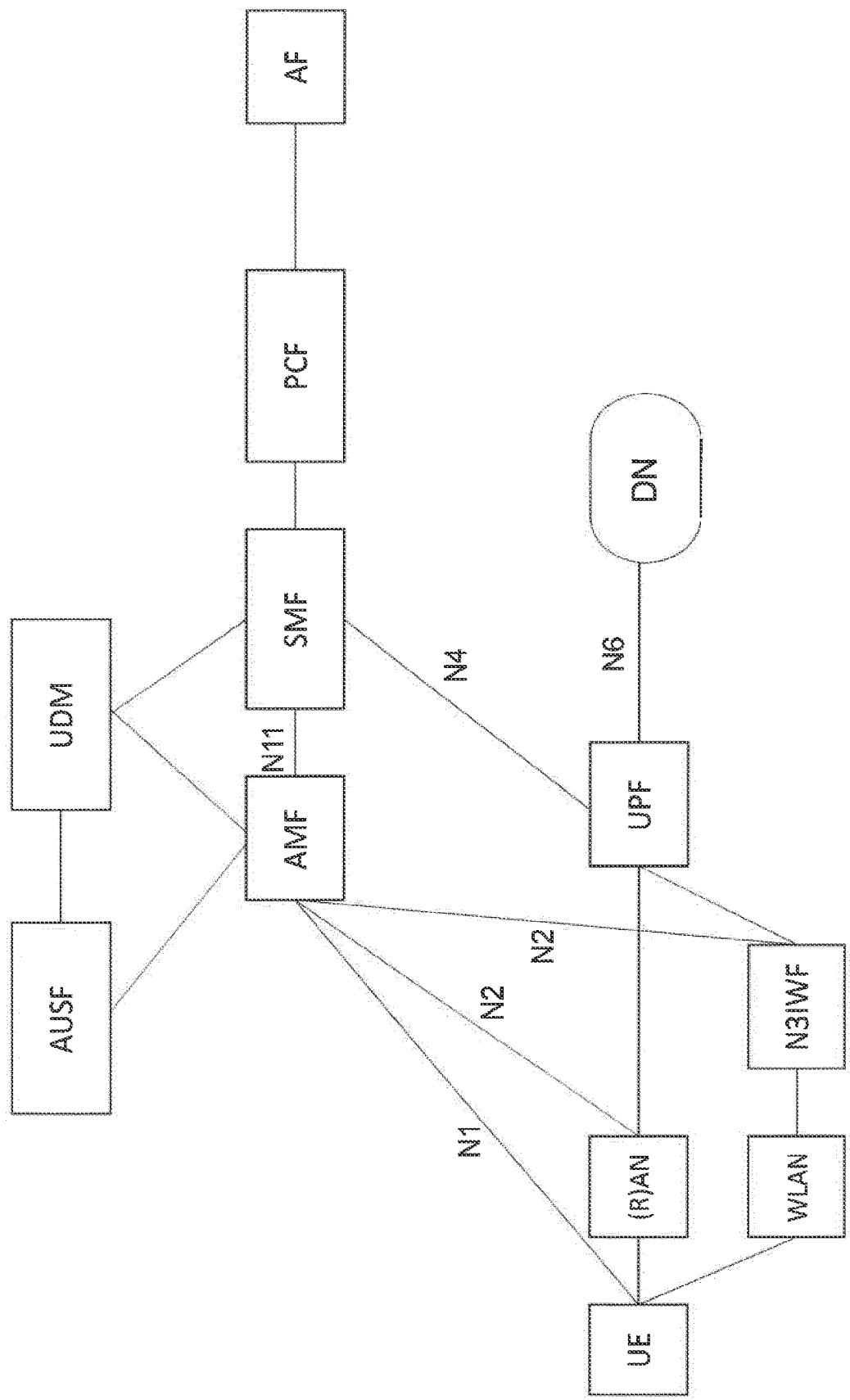
FIG. 4 is a schematic diagram of a known interworking arrangement of a 3GPP network and a non-3GPP network.

As a pre-requisite, it is assumed that the UE has registered in the visited network and is thus authenticated by a AUSF in the home network against credentials of the UDM, maybe in a procedure similar to that depicted in FIG. 4.

Figure 7:
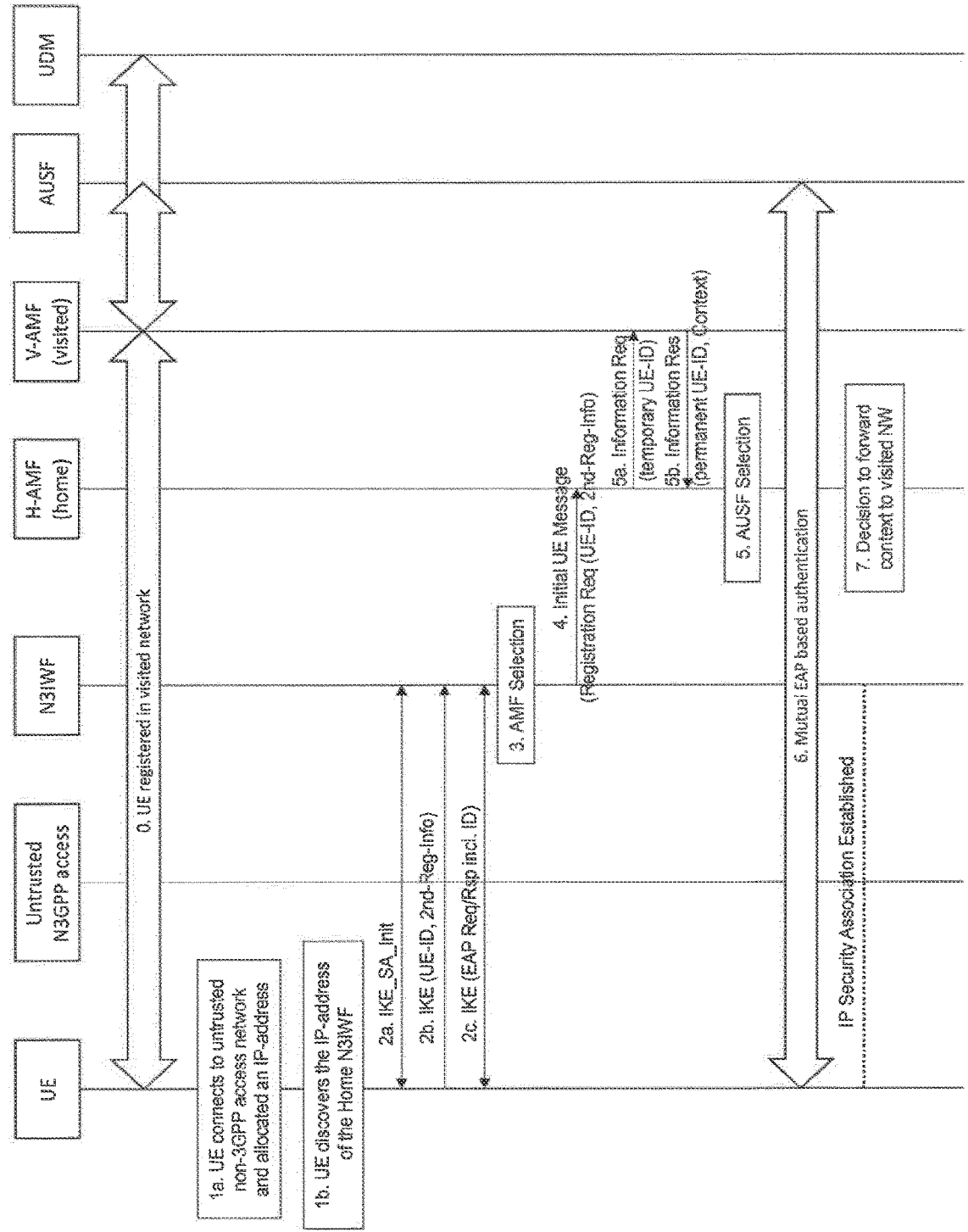
FIG. 7 is a message flow chart for the arrangement of FIG. 6.

FIG. 7 shows a message sequence of a registration of a N3GPP access according to this invention. The above mentioned pre-requisite is shown in FIG. 7 as step 0.

To gain N3GPP access to the home network, the UE connects to the untrusted WLAN network and acquires an IP-address in steps 1a of FIG. 7. The UE then discovers the address of the N3IWF of its home network. The address or the name, e.g. a fully qualified domain name, e.g. e.g. "roaming.n3iwf.de.provider.com", may be stored on the UICC (SIM card) or it may have been configured in advance. A DNS name resolution may take place or any other procedure that leads to a valid address of the N3IWF.

The UE then contacts the N3IWF and establishes initial security association based on a Diffie-Hellman handshake so that further communication is encrypted (step 2a). The UE then exchanges several IKE request and response messages in which the UE provides the temporary UE identity.

It is one aspect of this invention, that the UE provides, in addition to an identity, the information that the contact is made in order to request a secondary registration, or in other words in order to register a N3GPP access connection to the core network in addition to the already existing connection over a 3GPP RAN. This information may be provided in an IKE message as depicted in step 2b of FIG. 7 as "2nd-Reg-Info" and it may be provided in form of a simple flag or as a specific message.

According to this invention, the N3IWF selects an AMF within the home network in step 3, in the following named H-AMF, and generates a message on behalf of the UE which requests establishment and registration of the N3GPP access in step 4. According to this invention, the message or another message from N3IWF to H-AMF contains the information that the registration is additional to a primary registration over a (R)AN in the visited network.

If the use case was not a roaming use case, the N3IWF could select the AMF at which the UE is already registered based on a temporary UE-ID provided by the UE to the N3IWF. If that AMF is not reachable from the N3IWF, a different AMF could be selected that will then request a handover of control from old to new AMF as discussed above. In the roaming use case, this is not possible as the N3IWF cannot directly contact the AMF of the visited network and handover of control to the home network is not possible for roaming. The home network may choose whether the registration is performed as a secondary registration to the already existing registration to the visited network or it is performed as a primary registration in the home network replacing the registration at the visited network.

The H-AMF then requests information about the UE from the V-AMF in an information request (step 5a) providing the temporary UE-ID to the V-AMF. The V-AMF sends a response to the H-AMF containing the permanent ID of the UE and context information.

The information request may also comprise information indicating to the V-AMF that the request is done to register a secondary access and/or a non-3GPP access and the V-AMF may send back only a subset of context information available in the V-AMF.

Figure 5:
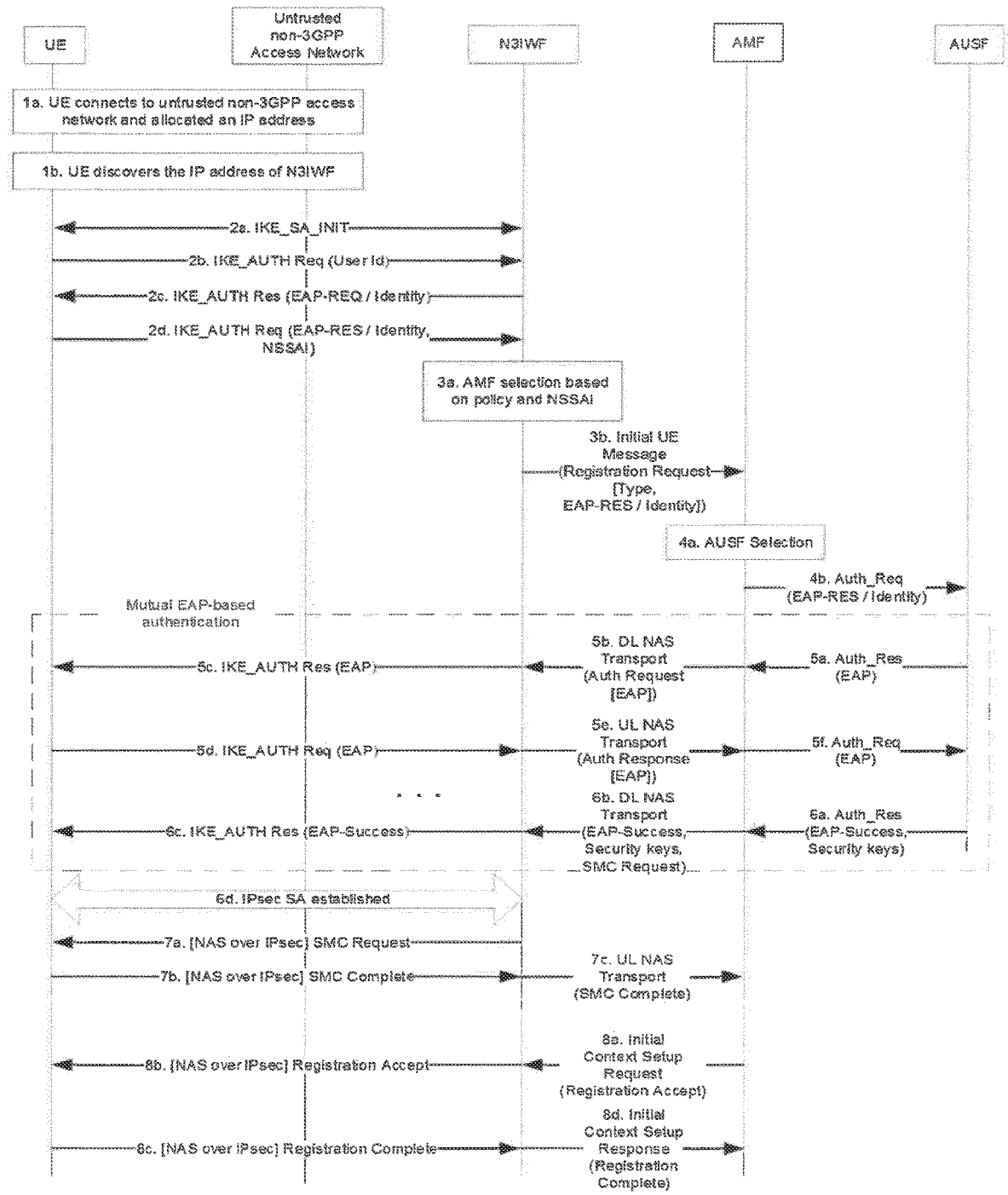
FIG. 5 is a message flow chart for the arrangement of FIG. 4.

The H-AMF then selects an AUSF in step 5 based on the permanent UE-ID. H-AMF, AUSF, N3IWF and UE perform a mutual EAP based authentication in step 6 that ends in an IPSec tunnel and a security association between UE and N3IWF and a connection from N3IWF to the H-AMF being established. This step is very similar or identical to what is shown in FIG. 5 for normal registration over N3GPP access.

Now, the H-AMF may decide whether to forward the UE context to the visited network according to this invention at all. Alternatively, the H-AMF continues a normal N3IWF-based registration procedure of FIG. 5 which ends with a registration of the UE in the home network and release of the registration of the UE in the visited network. The H-AMF may in that case take context information received from the V-AMF into account to re-establish services in the home network that are currently used in the visited network.

The decision may be based on information received by the H-AMF from the UDM, e.g. subscriber information, and/or from the PCF, e.g. operator policies taking into account current network load, operator preferences and other network or subscriber related information. The H-AMF may request and receive respective information from the UMD and the PCF which is not depicted in FIG. 7. Based on the information and potentially additional information gained during the registration procedure, the H-AMF takes the decision in step 7.

Step 7 may also be performed at another, especially earlier, phase of the described procedure. The sequence of messages and steps in FIG. 7 is just an example. For example, the H-AMF may take the decision how to progress the registration request directly after it received the registration request or at any time during the mutual authentication.

After the decision to forward the UE context to the visited network, the invention introduces new technical steps to transfer the UE context from the H-AMF to the V-AMF in the visited network and to add the N3GPP access link to the UE context in the AMF.

The following steps are illustrated in FIG. 8 which shows a continuation of the message sequence shown in FIG. 7.

Assuming the forwarding is decided, the H-AMF transmits the UE context to the V-AMF as shown. The message used may example wise be a reply to the Information response received from the V-AMF in FIG. 8 in step 9. This message contains the context the H-AMF generated during the registration procedure, i.e. it may contain the UE permanent ID received from or authenticated by the AUSF, security keys of the UE and the N3IWF, but also the address of the N3IWF.

The V-AMF in the visited network will then contact the N3IWF using the address received from the H-AMF and request that the connection from the N3IWF to the core network is switched from the H-AMF to the V-AMF. A Path Switch Request message is shown example wise in FIG. 8, step 10a. This may include a tunnel establishment and mutual authentication between N3IWF and V-AMF which is not shown explicitly in FIG. 8. The N3IWF will acknowledge the switching to the V-AMF with a respective response message in step 10b. The path switch may alternatively be requested by the H-AMF.

The V-AMF may acknowledge the N3GPP context transfer and the switch of the route with a final Information Acknowledgement message in step 11. The H-AMF can then delete the UE context in step 12.

Now, the AMF in the visited network will inform the UE over the newly established route from AMF via N3IWF about the acceptance of the N3GPP connection registration. According to this invention, the accept message in step 13a. may contain configuration information containing rules for the routing of control plane messages. As the UE has now two different routes established to the AMF, the rules may allow the UE to decide which route to use for control messages and conditions for the decision. It is also possible to transmit control information over both routes to increase reception likelihood.

The UE completes the registration procedure with a Registration Complete message in step 13b. that may be transmitted according to the routing rules received before either over the N3GPP access or over the (R)AN.

In one aspect of the invention, a public land mobile network, PLMN, acts as a home PLMN, H-PLMN. A second network, acting as an H-PLMN, receives from a UE device a request for registration of a second access, the request comprising information about a first registration with a first network, the second network, subsequent to performing mutual authentication between the device and the second network and establishing a secure connection over the second access, forwards second access information to the first network, the second access information enabling the first network to register the second access and use the secure connection over the second access to exchange registration information with the device.

The second network may be a home network of a subscriber of the device and the first network a visited (or roamed-to) network. The first access could be over a 3GPP radio access network, the second access being an access over a non-3GPP access network. Then the first access is over a trusted access network and the second access is over an untrusted access network. The registration of the first access of the device with the first network comprises mutual authentication between the device and the second network (=Roaming principle).

The secure connection may comprise a security association between the device and an entity of the second access, and an IPSec connection between the device and the entity. The performance of a mutual authentication and establishment a secure connection is done without impacting the first registration of the device in the first network. The second network before forwarding second access information to the first network determining based on one or more of subscriber information, policy information and service information available in the second network, whether to forward second access information to the first network, or request release of the first access registration of the UE from the first network.

The H-PLMN might include a second node receiving from a device a request for registration of a second access, the request comprising information about a first registration with a first node of a first network, the second node requesting and receiving first context information of the device from the first node, establishing a secure connection to the device over the second access, providing second context information to the first node, the second context information comprising information about the second access and about the secure connection, and in reply to receiving an acknowledgement of successful reception of the second context information by the first node deleting the device context in the second node.

In one aspect of the invention, a PLMN acts as a visited PLMN or V-PLMN. A first network registers a first access of a device, the registering comprises requesting authentication of the device from a second network, the first network receives from the second network a request for registration of a second access of the device, the second access including an established security association (and an IPSec connection) between the device and an entity providing the second access, the request comprising information used by the first network to connect to the device over the second access using the security association (and the IPSec connection).

A still further aspect of the invention is a UE which registers in a first network via a first access, requests registration of a second access from a second network establishing a security association (and IPSec connection) over the second access with the second network and receives a reply to the registration request from the first network over the second access while maintaining the first access to the first network.

The invention claimed is:

1. A method comprising:
receiving, for a user equipment (UE) registered with a registration in a first network over a first access network and by a system in a second network, a request to register the user equipment over a second access network, wherein the request includes information that the UE is registered in the first network over the first access network, the first network being a different network than the second network, wherein receiving the request comprises receiving, for the UE that is registered in the first network and has an internet protocol (IPsec) tunnel established with the first network, the request to register the UE over the second access network;
establishing, by the system in the second network, a security association with the UE over the second access network; and
forwarding, by the system in the second network and to a first system in the first network, security association information regarding the security association with the UE over the second access network to enable the first system to use the security association information to register the UE over the second access network while maintaining the registration of the UE in the first network over the first access network as a sole registration for the UE and to enable data exchange between the UE and the first network over the first access network and over the second access network.

2. The method of claim 1, wherein the first access network uses first radio access technology that is different from second radio access technology used by the second access network.

3. The method of claim 1, wherein the information comprises at least one of:
a flag in an attach message,
a message indicating either of a secondary attach request message or a secondary registration message, or
a flag, an information field, a parameter and an identity in a message according to an internet key exchange protocol.

4. The method of claim 1, comprising:
receiving, by the system in the second network and from the first system in the first network, second information regarding the UE, wherein:
establishing the security association uses the second information.

5. The method of claim 4, wherein receiving the request comprises receiving, from the UE, the request.

6. The method of claim 4, wherein the second information regarding the UE includes a permanent identity of the UE.

7. The method of claim 1, wherein establishing the security association uses a permanent identity of the UE.

8. The method of claim 1, wherein the security association information includes one of: an address of the second access network or security parameters of the security association.

9. The method of claim 1, wherein the security association information comprises an access link.

10. The method of claim 1, wherein the first access network is a trusted access network and the second access network is an untrusted access network.

11. The method of claim 1, comprising:
receiving, from a system in the first network, an acknowledgement of successful reception of the information about the UE; and
in response to receipt of the acknowledgement, deleting, from the system, a UE device context.

12. A system comprising: processing circuitry and one or more storage devices on which are stored instructions that are operable, when executed by the processing circuitry, to cause the processing circuitry to perform operations comprising:
registering, by the system in a first network and over a first access network, a user equipment (UE), the registering comprising establishing an internet protocol (IPsec) tunnel between the first network and the UE;

receiving, from a second system in a second network that is a different network than the first network and while the UE is registered in the first network and the IPsec tunnel is established with the first network, a request to register a second access of the UE to the first network over a second access network in the second network, wherein the request includes security association information for an established security association, included in the second access, between the UE and the second system in the second network;

registering, by the system for the UE that is registered in the first network and has the internet protocol (IPsec) tunnel established with the first network and using the security association information, the second access of the UE over the second access network while maintaining the registration of the UE in the first network over the first access network as a sole registration for the UE; and exchanging, over the first access network or the second access network, data with the UE.

13. The system of claim 12, the operations comprising:
requesting, from the second system in the second network, authentication information of the UE,
wherein receiving the request is responsive to requesting the authentication information of the UE.

14. The system of claim 13, wherein requesting authentication information of the UE comprises sending a request for authentication information of the UE, wherein the request includes an identifier for the UE.

15. The system of claim 12, wherein the first access network uses first radio access technology that is different from second radio access technology used by the second access network.

16. The system of claim 12, wherein the security association information includes one of: an address of the second access network or security parameters of the established security association.

17. The system of claim 12, wherein the security association information comprises an access link.

18. The system of claim 12, wherein registering the second access comprises registering the second access using the security association information while maintaining the sole registration of the UE in the first network over the first access network using an access link for between the UE and the system.

19. The system of claim 12, the operating comprising transmitting, by the system and to the second system, an acknowledgement of successful reception of the information about the UE to cause the second system to delete a UE device context.

20. A system comprising: one or more processors configured to perform operations comprising:
receiving, for a user equipment (UE) registered in a first network over a first access network, a request to register the user equipment over a second access network, wherein the request includes information that the UE is registered in the first network over the first access network, the first network being a different network than a second network that includes the system;
establishing a security association with the UE over the second access network;
forwarding, to a first system in the first network, information about the UE to enable the first system to use the information to register the UE over the second access network while maintaining the registration of the UE in the first network as a sole registration for the UE;
receiving, from a system in the first network, an acknowledgement of successful reception of the information about the UE; and
in response to receipt of the acknowledgement, deleting, from the system, a UE device context.

* * * * *